US009935668B1

United States Patent
Morse et al.

(10) Patent No.: US 9,935,668 B1
(45) Date of Patent: Apr. 3, 2018

(54) DETACHMENT MECHANISM AND INDICATOR FOR MOBILE MOUNT PORTABLE RADIO AND METHOD FOR THE SAME

(71) Applicant: Datron World Communications, Inc., Vista, CA (US)

(72) Inventors: Irwin H. Morse, San Diego, CA (US); Arthur C. Lashbrook, Vista, CA (US); Nicholas Philip Caponera, Valatie, NY (US); Richard R. Urmonas, Temecula, CA (US); James A. Pena, Encinitas, CA (US); Benjamin L. LaBelle, Carlsbad, CA (US)

(73) Assignee: Datron World Communications, Inc., Vista, CA (US)

( * ) Notice: Subject to any disclaimer, the term of this patent is extended or adjusted under 35 U.S.C. 154(b) by 0 days.

(21) Appl. No.: 15/435,201

(22) Filed: Feb. 16, 2017

(51) Int. Cl.
  *H04M 1/00* (2006.01)
  *H04B 1/3888* (2015.01)
  *H04B 1/3827* (2015.01)
  *H04B 1/3877* (2015.01)
  *H01R 13/04* (2006.01)
  *H01R 33/97* (2006.01)

(52) U.S. Cl.
  CPC ........... *H04B 1/3888* (2013.01); *H01R 13/04* (2013.01); *H01R 33/97* (2013.01); *H04B 1/3833* (2013.01); *H04B 1/3877* (2013.01)

(58) Field of Classification Search
  CPC . H04M 1/72527; H04B 1/082; H04B 1/3822; B65D 88/126; E05B 67/383

USPC ................ 455/575.8, 569.1, 128, 90.2, 90.3
See application file for complete search history.

(56) References Cited

U.S. PATENT DOCUMENTS

| | | |
|---|---|---|
| 3,933,404 A | 1/1976 | Oehlerking et al. |
| 4,091,318 A | 5/1978 | Eichler et al. |
| 4,627,107 A | 12/1986 | Hohlfeld |
| 4,723,281 A | 2/1988 | Peiker et al. |
| 4,761,823 A | 8/1988 | Fier |
| 4,892,486 A | 1/1990 | Guzik et al. |
| 4,927,382 A | 5/1990 | Huber |
| 4,955,071 A | 9/1990 | Wong et al. |
| 5,113,436 A | 5/1992 | Jarvela et al. |
| 5,174,787 A | 12/1992 | Shirai et al. |
| 5,305,381 A | 4/1994 | Wang et al. |
| 5,346,406 A | 9/1994 | Hoffman et al. |
| 5,463,688 A | 10/1995 | Wijas |
| 5,519,777 A | 5/1996 | Kurgan et al. |
| 5,538,436 A | 7/1996 | Garney |
| 5,591,035 A | 1/1997 | Burkholder et al. |
| 5,722,861 A | 3/1998 | Wetter |
| 5,888,087 A | 3/1999 | Hanson et al. |
| 6,379,187 B2 | 4/2002 | Nishimatsu |
| 7,021,950 B2 | 4/2006 | Borrego Bel et al. |
| 7,137,839 B2 | 11/2006 | Dilliner et al. |
| 7,789,714 B2 | 9/2010 | Liu |
| 7,928,738 B2 | 4/2011 | Sip |

(Continued)

*Primary Examiner* — Tu X Nguyen
(74) *Attorney, Agent, or Firm* — Knobbe Martens Olson & Bear LLP

(57) ABSTRACT

A ruggedized mobile mount for a portable handheld radio, including a detachment mechanism and indicator for removably attaching the handheld radio to the mobile mount is disclosed. In one embodiment, the detachment mechanism includes a mechanical indicator configured to indicate an attached and detached state of the handheld radio.

19 Claims, 9 Drawing Sheets

(56) References Cited

U.S. PATENT DOCUMENTS

| | | |
|---|---|---|
| 8,597,048 B2 | 12/2013 | Pfeiffer et al. |
| 8,734,186 B2 | 5/2014 | Panko et al. |
| 9,326,401 B2 | 4/2016 | Duran et al. |
| 2016/0020805 A1* | 1/2016 | Fan ..................... H04B 1/3822 |
| | | 455/556.1 |

* cited by examiner

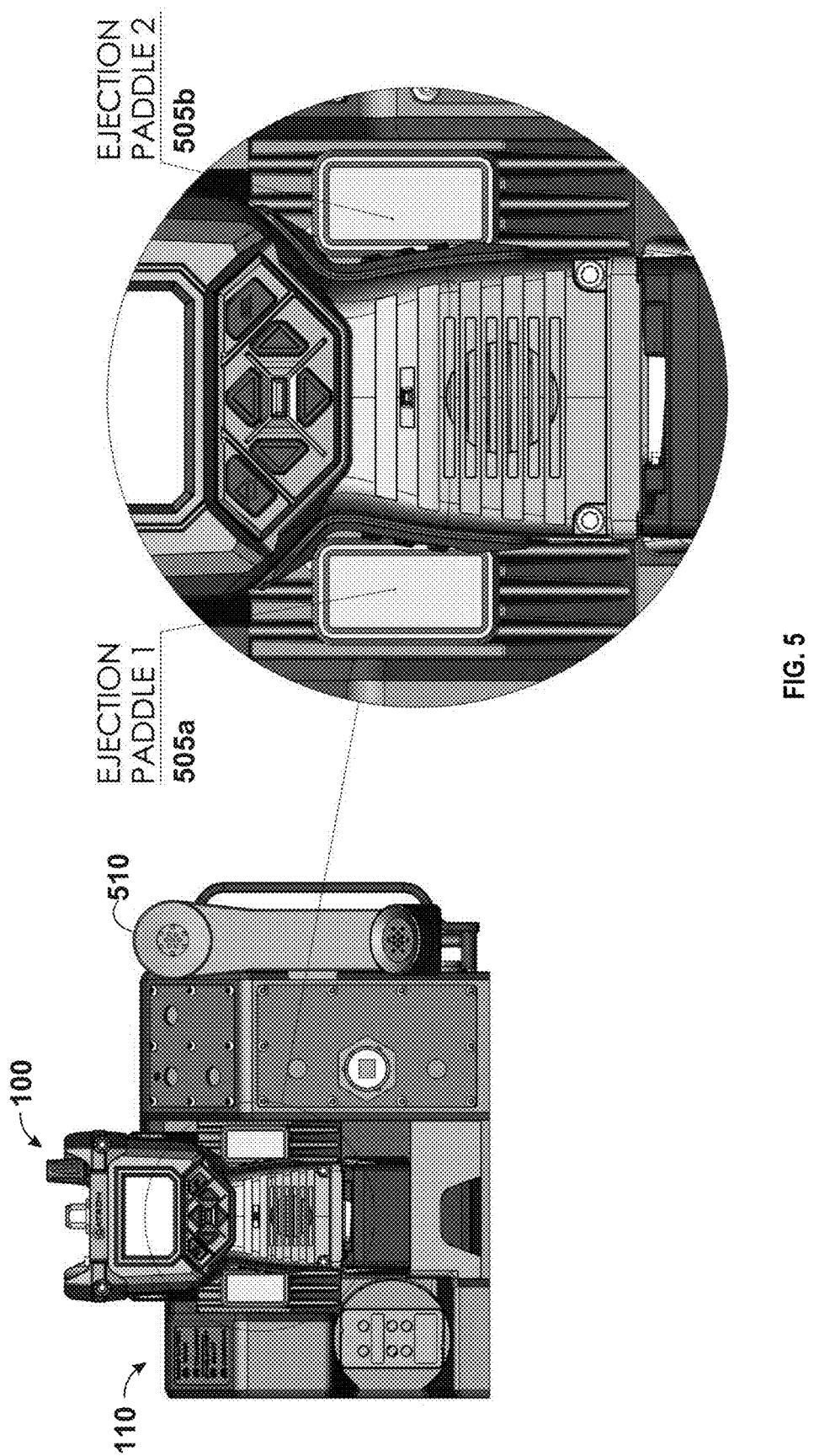

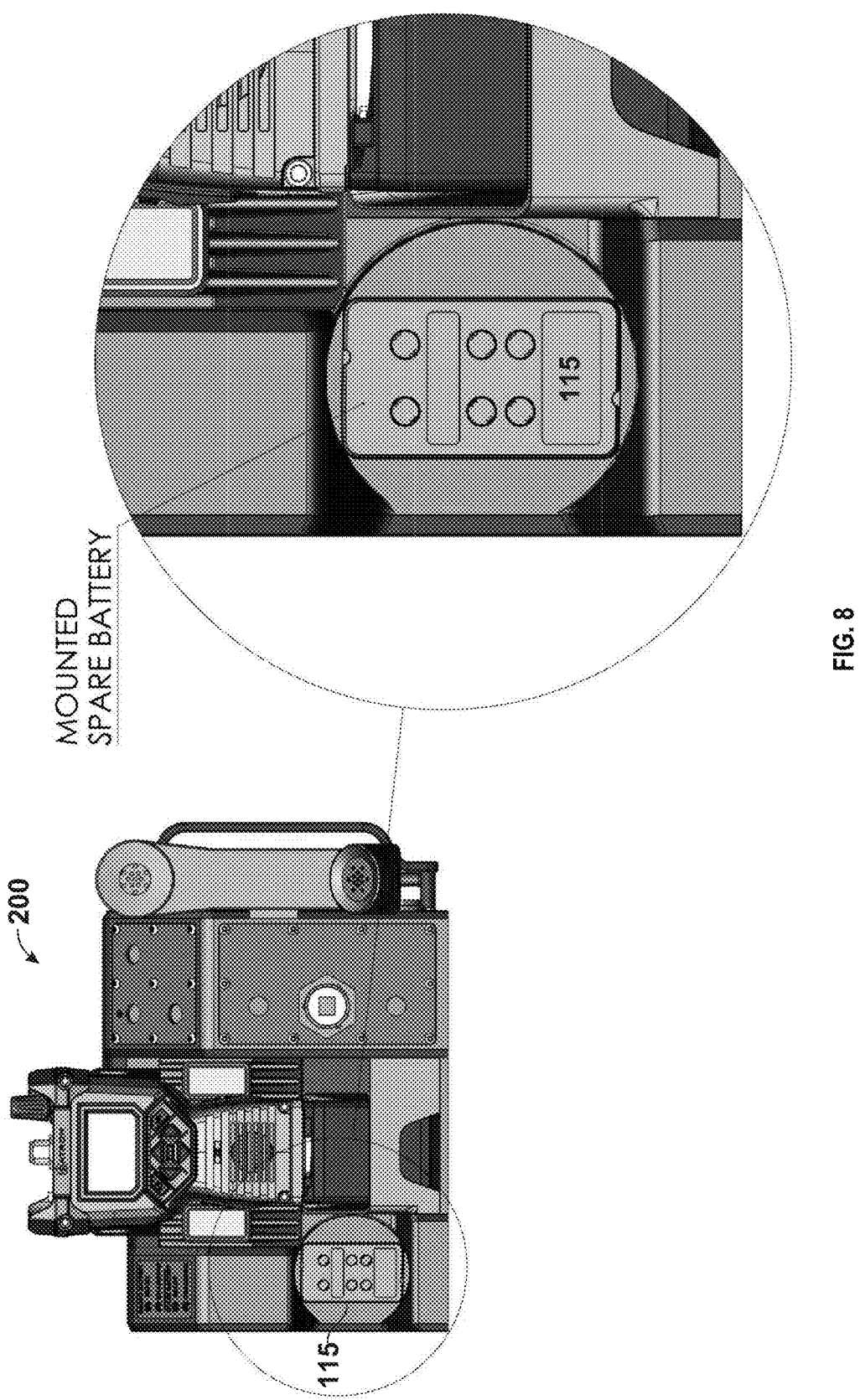

STEP 3

STEP 2

STEP 1

DETACHMENT MECHANISM AND INDICATOR FOR MOBILE MOUNT PORTABLE RADIO AND METHOD FOR THE SAME

BACKGROUND

Field

This disclosure generally relates to the field of radio frequency communication systems, and more specifically to devices, systems, and methods for removably attaching a portable radio to a mobile mount communications system.

Description of the Related Technology

Military units operate in a theater of operation, where the theater can include the entirety of the air space, land, and sea area that is or that may potentially become involved in military operations. The military units will be used strategically in the theater to execute a mission or objectives outlined in a concept of operations (CONOPS). In order to execute the CONOPS, the military units typically operate in smaller units separated throughout the theater, and rely on various communication channels to maintain situational awareness of each group. Situational awareness refers to the ability of each group to identify, process, and comprehend critical elements of information regarding each group with respect to the mission. Loss of communication between groups can lead to loss of situational awareness, increasing the potential for catastrophic events. The various communication channels used in support of the CONOPS include wireless communications over radio waves, often implemented using a half-duplex radio, colloquially known as a walkie-talkie, a handheld radio, or simply a radio.

The radio provides immediate, bi-direction audio communication between military units that are separated by a geographical distance or a physical structure. The half-duplex radio provides communication in both directions to two parties, but only one direction at a time (i.e., communication is not provided in both directions simultaneously). Typically, once a party begins receiving a signal, that party must wait for the transmitter to stop transmitting the signal, before replying. Half-duplex radios conserve bandwidth, since only a single communication channel is needed, which is shared alternately between the two parties. For example, the radio requires only a single frequency for bidirectional communication, while a full-duplex device (like a cell phone), requires two frequencies to carry the two simultaneous voice channels, one in each direction.

The use of radios in the theater has shown that the radio, and any associated equipment, must be designed to operate reliably in harsh usage environments and conditions, such as strong vibrations and shock, extreme temperatures, and wet or dusty conditions. As such, the radio design has become "ruggedized" to increase the device robustness and ability to tolerate harsh usage and environments. A primary feature of a ruggedized radio is the thicker and stronger housing compared to a radio designed for civilian use. This provides a relatively controlled environment for the installed electronics of the radio even in harsh environments. The installed electronics themselves may be selected and designed based on their ability to withstand higher and lower operating temperatures, and their ability to withstand shock. The ruggedized radio can also incorporate features such as fully sealed keypads or switches to protect against intrusion by dust or liquids, and scratch-resistant screens that are readable in direct sunlight.

The ability to operate the radio with one hand can be a critical necessity to military personnel. Modern radios, in general, include numerous functional features that require some type of user input. Designing such devices for single-handed operation, therefore, can present a substantial challenge. One such feature that requires user input is the push-to-talk (PTT) switch found on virtually every radio. The PTT switch allows a user to transmit audio, usually the user's voice, to another user who receives the transmitted audio. To transmit audio, a PTT switch must be held down, or activated, for the duration of the audio transmission. To receive a response transmission from the other user, the PTT switch must be released, or deactivated. Radios are typically limited to only one PTT switch and one microphone for voice input, such that the ergonomics associated with the device are limited to a right-handed operator. The single microphone input has value, in that more than one microphone would introduce additional noise to the audio transmitted from the radio. Hence, operating the PTT switch of a radio or other type of half-duplex communication device using a left hand, while simultaneously operating the numerous functional features of the radio, is difficult if not impossible for the average user with a dominant left hand. Therefore, a need exists for an ambidextrous PTT capability for the user with a dominant left hand.

An advantage offered by the radio is its mobile characteristics. The military grade radio is not only ruggedized to resist harsh environments, but it is wireless and compact enough to be brought to these environments without creating a weight or tactical detriment to the user. The radio owes its mobility to a battery that provides it with power for a fixed duration. Generally, the battery is contained in the housing of the radio, requiring the user to disassemble the radio in order to replace the battery. However, the military unit may spend extended periods of time in theater without access to the tools required to replace a dead or faulty battery, or without access to a battery charging device. Furthermore, while the radio may be operated by primary cells (dry cells) or by rechargeable secondary cells, the cost of continual replacement of dry cells, as well as the burden of maintaining a readily available store of dry cells in theater, makes use of the secondary or rechargeable cell more desirable and tactically advantageous. The use of such secondary cells permits the use of a battery recharger. Therefore, a need exists for an ambidextrous radio with a quick release capability that allows the user to easily replace the battery with a spare, and a mobile mount that can charge both the radio-attached battery and the spare.

The mobility of the radio allows the military unit to carry the radio on foot, but typically, the radio can also be integrated with a wireless communication system intended for terrestrial users. A tactical multi-band radio system is a wireless communication system intended for use by terrestrial users in vehicles or on foot, that includes the radio as well as a portable radio system. The tactical radio system allows the military unit flexibility in communication by integrating the radio with the portable radio system. For example, the portable radio system can be installed in a vehicle and attached to a more robust antenna that provides a broader spectrum of frequencies than that available to the radio carried on foot. Another advantage is the ability to separate the radio from the portable radio system while maintaining communication links on both sides.

Typically, when the user integrates the radio with the portable radio system, the functionality of the radio is replaced with the functionality of the portable radio system. Often, this can result in loss of the user preferred functionality, such as, user preferred frequency channels, stored data, and radio modes not available to the portable radio system (e.g., call list stored on the radio, name and call tone tagging, etc.). Furthermore, the radio can be docked or integrated with the portable radio system in a slightly sideways or torqued manner. In this case, the radio may not fully integrate with the portable radio system. Similarly, removal of the radio from a docked or integrated state from the portable radio system can result in loss of communication link and data due to an abrupt loss of data communication between the portable radio and the portable radio system, or an immediate change from portable radio system functionality to a default radio functionality.

Therefore, a need exists to allow for exchange of data between the radio and the portable radio system to allow for a functional handshake between the two devices, in order that functionality of both the radio and the portable radio system can exist. Furthermore, a need exists for an electromechanical indication of both full integration and full separation between the radio and the portable radio system so that no data or functionality is lost between the two devices.

SUMMARY OF CERTAIN INVENTIVE ASPECTS

The systems, methods and devices of this disclosure each have several innovative aspects, no single one of which is solely responsible for the desirable attributes disclosed herein.

One innovation includes a ruggedized mobile mount for a handheld radio that includes a housing configured to be removably attached to a vehicle and including at least one compartment configured to secure the handheld radio, a power port configured to receive power from the vehicle, a detachment mechanism including, a first pad on a left side of the detachment mechanism, a second pad on the right side of the detachment mechanism, a plurality of pins configured to engage with the handheld radio and arranged into two spatially separated groups, each group comprising a first section of pins and a second section of pins, wherein the second section of pins are shorter than the first section of pins, where the detachment mechanism is configured to removably attach the handheld radio to the mobile mount, and wherein the first pad and the second pad are configured to release the handheld radio from the plurality of pins upon an application of pressure onto either of the first pad or the second pad, and a processor for executing a process interrupt upon a break in contact between the handheld radio and the second section of pins.

For some embodiments, the ruggedized mobile mount includes an antenna port configured to removably attach an antenna connected to the vehicle. In some embodiments, the ruggedized mobile mount is configured to communicate data with the handheld radio via the plurality of pins. In some embodiments, the ruggedized mobile mount includes a plurality of pins configured to communicate GPS data and radio frequency (RF) data between the handheld radio and the mobile mount.

One innovation includes a ruggedized mobile mount for a handheld radio, that includes a detachment mechanism configured to removably attach the handheld radio to the mobile mount, including a first set of electrically conductive pins, a second set of electrically conductive pins, wherein the second set of pins are shorter in length relative to the first set of pins, a first pad and a second pad attached to a locking member configured to removably attach a set of conductive contacts on the handheld radio to the first set and the second set of electrically conductive pins.

For some embodiments, each of the first pad and the second pad are attached to a respective elongated member forming a pair of extensions from a torsional spring hinge. In some embodiments, the first pad is located on a left side of the detachment mechanism and the second pad is located on a right side of the detachment mechanism, such the first pad is adjacent to a left side of the handheld radio and the second pad is adjacent to a right side of the handheld radio when the radio is attached to the mobile mount. In some embodiments, the first pad and the second pad are configured to detach the handheld radio from the mobile mount with an application of pressure onto either of the first pad or the second pad. In some embodiments, the first and second set of pins are arranged into two spatially separated groups configured to receive and electrically connect to a complementary set of electrically conductive pads on the handheld radio when the radio is attached to the mobile mount. In some embodiments, the ruggedized mobile mount includes a processor configured to transfer control to an interrupt handler upon a break in contact between the handheld radio and the second set of pins. In some embodiments, the first and second pads are symmetrical about a vertical axis. In some embodiments, the ruggedized mobile mount includes a wedge-shaped locking member configured to be rotated about a pivot point of the torsional spring hinge upon an application of pressure onto either of the first pad or the second pad. In some embodiments, the locking member is configured to removably attach the handheld radio to the mobile mount via a structural catch forming a cavity in the handheld radio. In some embodiments, each of the first and second pads comprise a rectangular pad attached to a respective elongated member. In some embodiments, each of the first and second pads are biased in a locked position by a torsional spring.

One innovation includes a method of detaching the handheld radio from the mobile mount by actuating a locking member configured to removably attach the handheld radio to the mobile mount. Another innovation includes a method of attaching the handheld radio to the mobile mount that includes securing the handheld radio via a locking member configured to removably attach the handheld radio to the mobile mount.

BRIEF DESCRIPTION OF THE DRAWINGS

FIG. 5 is a plan view of a portion of the handheld radio and mobile mount, with a magnified view of a portion of a paddle locking system.

FIG. 8 is a front plan view of a portion of the handheld radio and mobile mount, with magnified view of a spare battery attached to a battery charger on the mobile mount.

DETAILED DESCRIPTION OF CERTAIN EMBODIMENTS

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

Portable Radio Mount

Figure 1:
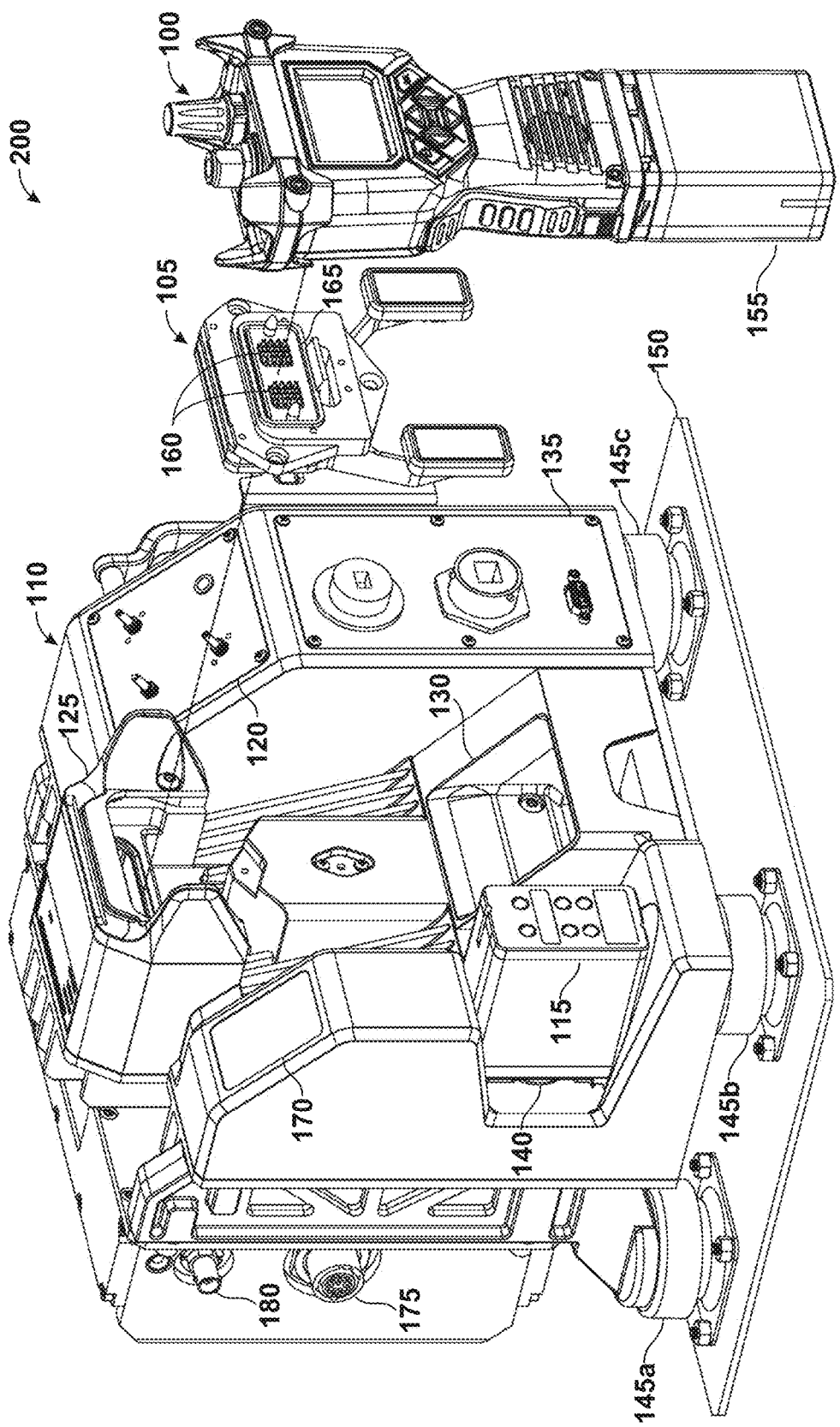
FIG. 1 is a front left perspective view of a tactical multi-band radio system including a handheld radio and a mobile mount.

FIG. 1 is a front left perspective view of a tactical multi-band radio system 200 including a mobile mount 110 and a handheld radio, or simply radio 100. As illustrated in FIG. 1, the mobile mount 110 includes a number of mounting elements 145a-c for mounting the mobile mount 110 to a structure. For example, the mobile mount 110 can include four (4) total mounting elements 145a-c. In another example, the mobile mount 110 can include a locking rail system or harness for attaching the mobile mount 110 to a structure. In the illustrated embodiment, the mobile mount 110 can be attached to a mounting base 150, or a radio shelf of the structure. The structure can be a console and/or frame of a vehicle, or a semi-permanent or permanent building such as a ground station. Here, the mobile mount 110 is physically ruggedized, and thus, can be constructed using an impact-resistant material such as high impact plastic or metal.

The mobile mount 110 includes an enclosure 130 or container that takes the form of a niche or cavity for integration of the handheld radio 100 with the mobile mount. The enclosure 130 is designed such that placement of the radio 100 into the enclosure 130 provides consistent and secure positioning that avoids movement. For example, the enclosure 130 includes a bottom surface and a rear surface that holds the radio upright. The enclosure 130 also include front and side surfaces that prevent the radio 100 from falling or moving. Holding the radio 100 in a secure and upright position improves the efficiency of a radio charging mechanism (not illustrated). The enclosure 130 of the mobile mount 110 includes conductive contacts for charging a battery 155 of the radio 100. The design of the enclosure 130 is such that when the radio 100 is secured in the enclosure, conductive contacts in the enclosure 130 connect with conductive contacts on the radio 100 to charge the battery 155. The mobile mount 110 includes a projected surface area or ridges 125 above the enclosure 130. The ridges 125 protect the radio 100 from collision from foreign objects while secured in the enclosure. The ridges 125 also provide supportive surfaces that stabilize the top of the radio 100 and prevent lateral movement.

Still referring to FIG. 1, the mobile mount 110 includes an attached paddle locking system 105 (the system 105 is shown in the exploded view as a separate detailed part merely for didactic purposes) for both locking and unlocking the radio 100 to and from the mobile mount 110. The paddle locking system includes a gasket 165 and an array of conductive pins 160 having one or more electrically conductive terminals configured to engage one or more receptacles located on the back of the radio 100. The gasket 165 is constructed of an elastomeric material (e.g., rubber, silicone, or plastic) for creating a seal between the radio 100 and the mobile mount 110 against outdoor environmental conditions in the field. The conductive pins 160 provide a functional and physical interface to the radio 100 via an electrical component receptacle (ECR) 315, discussed in detail below. Functionally, the conductive pins 160 provide an interface for which the radio 100 can be controlled via input devices on the mobile mount 110. As one example, the user may attach an external microphone handset 510 (FIG. 5) to the mobile mount 110, where the external microphone handset 510 includes a PTT switch. In another example, the mobile mount 110 can include a software controlled selector knob on the control panel 120 that can be configured to control functions of the mobile mount 110 and/or radio 100. For example, the selector knob can be programmed to change a frequency channel, adjust audio volume, contrast and brightness of a display, and a squelch level. The conductive pins 160 can also provide an interface for which data can be communicated from the radio 100 to an output device on the mobile mount 110. Audio signals received by the radio 100 can be broadcast over an audio speaker system (not illustrated) on the mobile mount 110.

In some embodiments, the mobile mount 110 includes a power connector 175 for attaching a power source, and an antenna connector 180 for connecting an external antenna. The conductive pins 160 can be physically integrated with the antenna connected to the mobile mount 110. In such a configuration, the conductive pins 160 can extend the functionality of the antenna to the radio 100 while the radio 100 is mounted. Here, the mobile mount 110 includes an indicator panel 170 used to provide visual indicators. For example, the indicator panel 170 can include a circuit with a number of lights for indicating fault occurrences or a state of the radio 100 and mobile mount 110. The fault occurrences can include low or no battery power, connection fault, and circuit failure. The state can include a power-on indicator, a battery charging indicator, and a battery full indicator.

In the depicted embodiment, the mobile mount 110 includes a control panel 120 functionally integrated with the radio 100, when mounted. The control panel 120 includes input devices and output devices, or user interface components, that allow the user to exploit the functionality of the radio 100 and/or mobile mount 110. The input devices can include, by way of example, a keypad, navigation keys, a microphone, switches, and buttons for controlling the radio 100 and/or the mobile mount 110. Each of the listed input devices is well known in the art, and therefore will not be further described. Any known, or input device of the future suitable for the particular application, can be used. The output devices can include an audio speaker system (not illustrated) and indicator panel 170, for example.

Still referring to FIG. 1, the mobile mount 110 includes an interface panel 135. The interface panel 135 includes ports for connecting ancillary equipment. As one example, the ancillary equipment includes computing systems, such as laptops, tablets, smart phones, and other computing devices. The ports include interface elements for connecting wire harnesses and serial communication interfaces. The functionality of the radio 100 and/or the mobile mount 110 can be updated or modified using a computing system connected to the interface panel 135.

Portable Radio

Figure 2C:
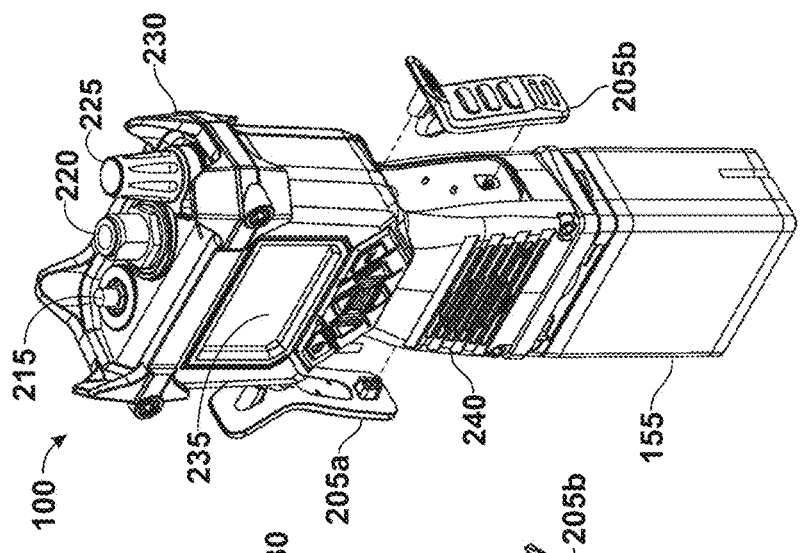
FIG. 2C is a front right and top perspective view of the handheld radio equipped with programmable, ambidextrous PTT switch functionality. The PTT switches are detached to illustrate form function.
Figure 2B:
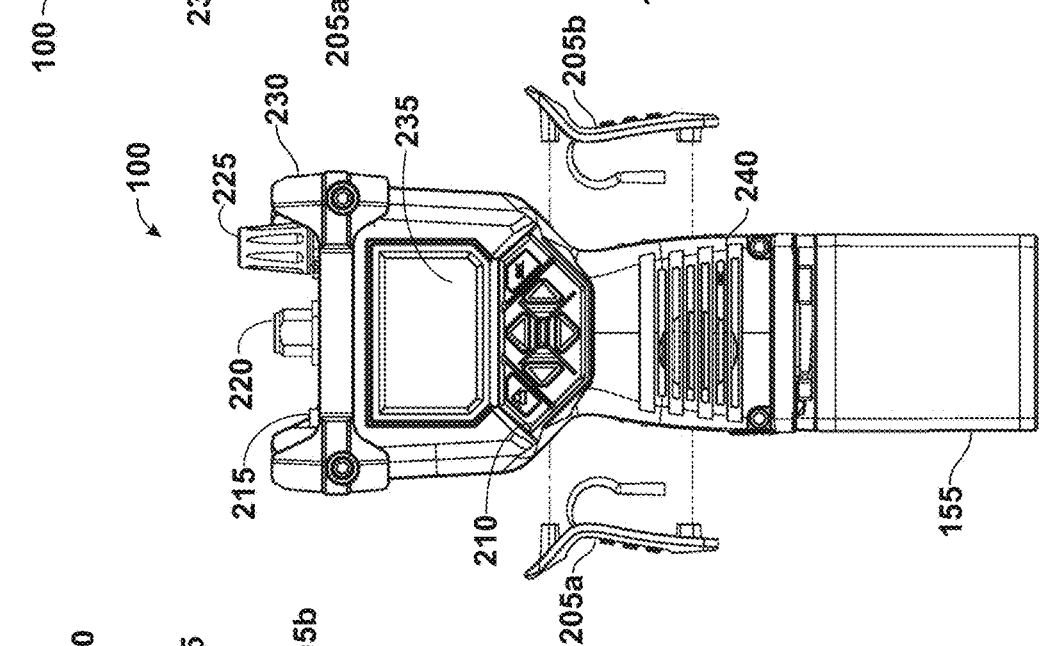
FIG. 2B is a front plan view of the handheld radio unit equipped with programmable, ambidextrous PTT switch functionality. The PTT switches are detached to illustrate form function.
Figure 2A:
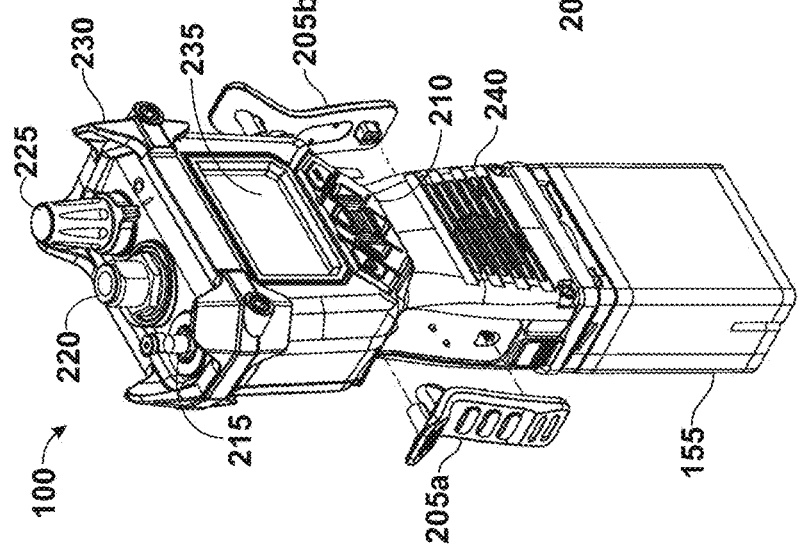
FIG. 2A is a front left and top perspective view of the handheld radio equipped with programmable, ambidextrous PTT switch functionality. The PTT switches are detached to illustrate form function.

FIG. 2A is a front left and top perspective view of the radio 100 equipped with programmable, multiple PTT switch functionality. The PTT switches 205a-b are shown as detached from the radio merely for didactic purposes. FIGS. 2B and 2C are substantially similar, and show a front plan view of the radio 100, and a front right and top perspective view of the radio 100, respectively.

The radio 100 includes multiple physical components. Namely, the battery 155, dual PTT switches 205a-b, a keypad 210, a GPS antenna port 215, a radio antenna port 220, a control knob 225 (can also include an ON-OFF switch), a ridge cap 230, a display 235 and an audio I/O 240. Conceivably, the radio 100 can include more, fewer, or different physical components.

Figure 3:
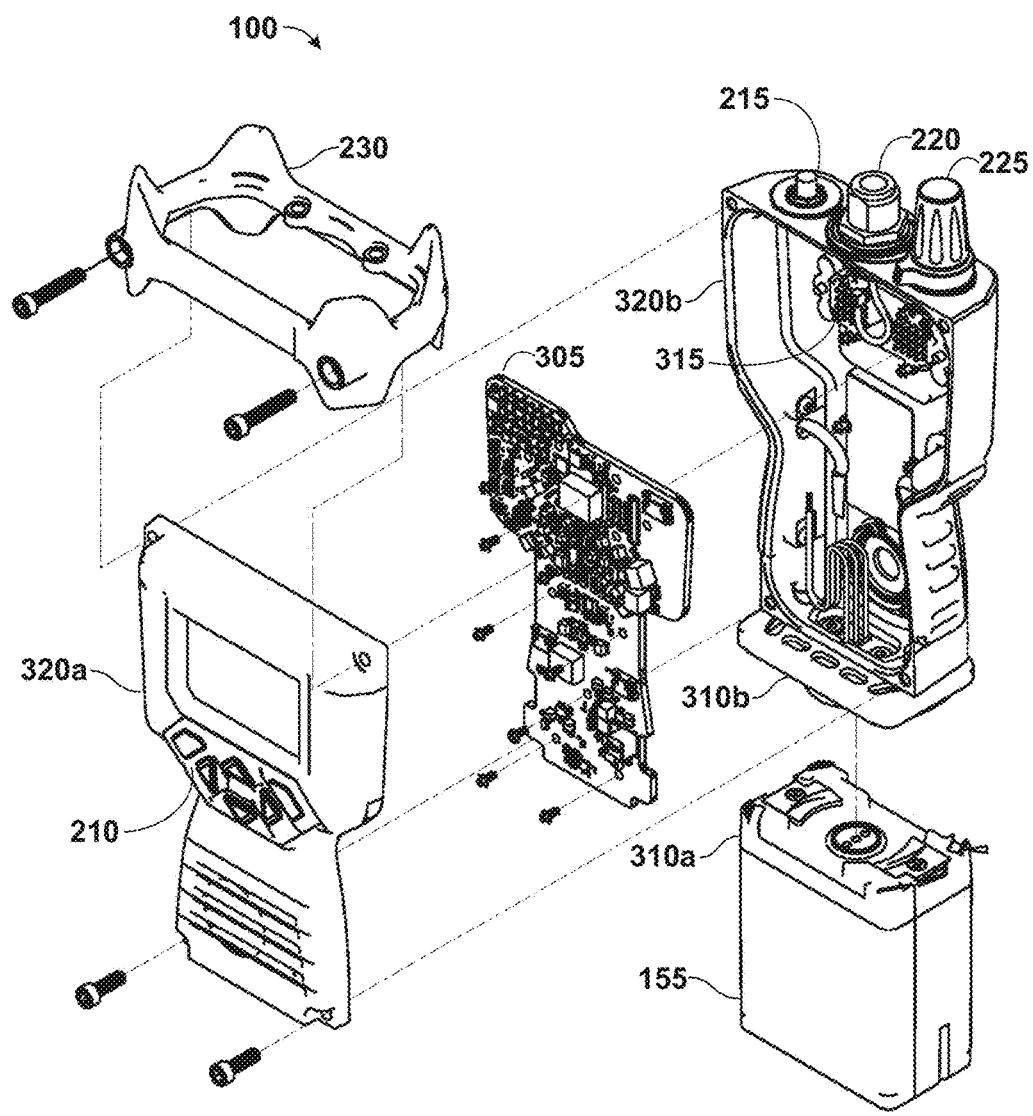
FIG. 3 is an exploded perspective view of the handheld radio.

The radio 100 is shaped such that the dual PTT switches 205a-b on the left and right sides of the radio 100 are symmetrical about a vertical axis and shaped to provide a user with a comfortable grip of the radio 100. As shown in FIG. 1, both of the PTT switches 205a-b are identical in size and shape, such that a left-handed user can handle the radio 100 using a grip substantially similar to that of a right-handed user. The PTT switches 205a-b include a concave surface that curves inward along the left and right sides of the front and rear surfaces 320a-b of the radio 100. This curvature provides ease of use and grip to a user with relatively small hands. In one embodiment, the dual PTT switches 205a-b are constructed of a member covered with elastomeric material (e.g., rubber, polymer, silicone). However, solid metal switches are also possible. Each PTT switch 205a-b includes at least one electrical contact that engages with a processing unit 305 (FIG. 3). FIGS. 2A, 2B, and 2C illustrate each PTT switch 205a-b as having three embedded dome switches wired in parallel, however, other implementations include fewer, or additional electrical contacts located at various positions, on each switch.

The keypad 210 is located on a front surface of the radio 100, and includes a number of buttons or switches that, when activated, generate an electrical output. In one embodiment, the keypad 210 is constructed of buttons or switches covered in an elastomeric material. However, a keypad 210 constructed of metal elements, or a combination of metal and elastomeric elements is also contemplated. The buttons extend through openings in a shell formed in the upper portion of the front surface, below the display 235, as shown in FIGS. 2A, 2B, and 2C. The radio 100 also includes the GPS antenna port 215 that is compatible with at least one of a GNSS, GPS L1, GLONASS L1, BeiDou B1, and Galileo E1 frequency system, and configured to accept a GPS antenna. In one implementation, the GPS antenna is integrated with a noise amplifier and a pre-filter to prevent saturation by high level sub-harmonics and L-band signals.

The radio 100 includes the antenna port 220 that encompasses a half-duplex wireless transceiver configured to alternate between transmission and reception of radio signals over a radio network. The antenna port 220 also includes an antenna jack configured to mate with an antenna and support one, or both, of a narrowband and a wideband waveform. For example, the antenna port 220 is configured to operate over a narrowband frequency range of 30 MHz-512 MHz, including an AM frequency (108 to 512 MHz), FM frequency (30 to 512 MHz), and digital FM (Spectre waveform 30 to 512 MHz). The antenna port is also configured to support one ECCM waveform to protect narrowband voice and data from interference, and at least three different encryption algorithms.

The radio 100 includes the software controlled control knob 225 for controlling functional aspects of the radio 100 and/or mobile mount 110. For example, the utility knob can be calibrated to control one or more of a volume of audio output, a selection of a frequency channel, and a brightness and contrast of the display 235. The control knob 225 also includes an ON-OFF switch for powering the radio 100 on and off. The radio 100 also includes the ridge cap 230, formed from an impact-resistant material such as high impact plastic or metal, arranged substantially around a top portion of the radio 100. The ridge cap 230 is a continuous circular component that fastens a front surface 320a and a rear surface 320b (FIG. 3) of the radio 100 together.

The radio 100 includes the display 235 mounted within an opening of the upper portion of the front surface. Here, the display 235 is a liquid crystal display, although any other suitable type of electronic display could be considered for use, for example, a touch sensitive display. The radio 100 can further include the audio I/O 240 that includes a speaker and a microphone mounted within a cavity formed in the lower portion of the front surface, and behind a grill or ribbed surface formed over the cavity.

In the depicted embodiment, the radio 100 is configured to embody and perform some or all of the techniques of this disclosure. In some examples, the techniques described in this disclosure may be shared among the various components of the radio 100 and the mobile mount 110.

FIG. 3 is an exploded perspective view of the radio 100. The radio 100 is an assembly of various components, including the processing unit 305, a battery connector plug 310a (or battery terminal), a battery connector receptacle 310b, the ECR 315, a front surface 320a, and a rear surface 320b. Other parts of the radio 100 described above are illustrated in FIG. 3 for reference. In other examples, the radio 100 can be constructed from more, fewer, or different parts.

The radio 100 includes the processing unit 305, enclosed within the front surface 320a and rear surface 320b of the radio 100. Both the front surface and the rear surface 320a-b can be formed from the same impact-resistant material such as high impact plastic or metal. The processing unit 305 includes a processor, controller, ASIC, field programmable gate array (FPGA), and/or dedicated hardware. The processing unit 305 also includes a printed circuit board containing electrical connections that connect with various elements of the radio 100 and physically integrate the dual PTT switches 205a-b, display 235, battery 155, keypad 210, control knob 225 (and ON-OFF switch), ECR 315, and antenna port 220, with the processing unit 305. The processing unit 305 also includes a memory unit (not illustrated) containing at least one of a read-only memory (ROM), a random access memory (RAM), and a non-volatile random access memory (NVRAM). The memory unit provides instructions and data to the processing unit 305, the instructions being executable to implement various functionality. The processing unit 305 also includes RF circuitry, including filter circuits for supporting RF communications.

The ECR 315 includes multiple electrically conductive receptacles for contacting the conductive pins 160 when the radio 100 is mounted to the mobile mount 110. In one implementation, the ECR 315 is an array of female conductive receptacles. In another implementation, the ECR 315 is an array of conductive contact pads, whereby the ECR 315 and the conductive pins 160 are connected via a solder cup and spring header configuration. The ECR 315 interfaces directly or indirectly with any of the components of the radio 100 via the processing unit 305. As such, the radio 100 provides information to the control panel 120 and/or the interface panel 135 of the mobile mount 110 via the conductive pins 160 and ECR 315 connection.

The battery 155 includes the battery connector plug 310a configured to connect to either the radio 100, or the battery charger 140 via the battery connector receptacle 310b. In the depicted implementation, the battery connector plug 310a is attached to the battery 155, and the battery connection receptacle 310b is attached to the bottom side of the rear surface 320b of the radio 100. The battery connectors 310a-b include one of a solder cup or printed circuit board termination by which the battery 155 supplies power to the radio 100. The connectors 310a-b can be sealed to substantially 15 psi, and include spring loaded contacts and a twist-lock mating mechanism configured to physically secure the battery 155 to both the radio 100 and mobile mount 110. The connectors 310a-b also provide power contacts between the battery 155 and the mobile mount 110, by which the mobile mount 110 supplies power to charge the battery 155. The connectors 310a-b provide a ruggedized seal connection between the battery 155 and the radio 100, making the connection substantially water proof and shock proof. In the depicted embodiment, the connectors 310a-b attach using a rotational locking mechanism, whereby the battery 155 is attached to the radio 100 by rotation for secure positioning. An additional latch lock locking mechanism is used to secure the battery 155 to the radio 100 once the battery is attached. The latch lock engages with the battery 155 after electrical contacts on the battery have engaged with electrical contacts on the radio. The connectors 310a-b and the latch lock facilitate the maintenance of a constant force between the electrical contacts while mitigating contact chatter, and preventing inadvertent battery unlocking from the rotational locking mechanism.

Figure 4:
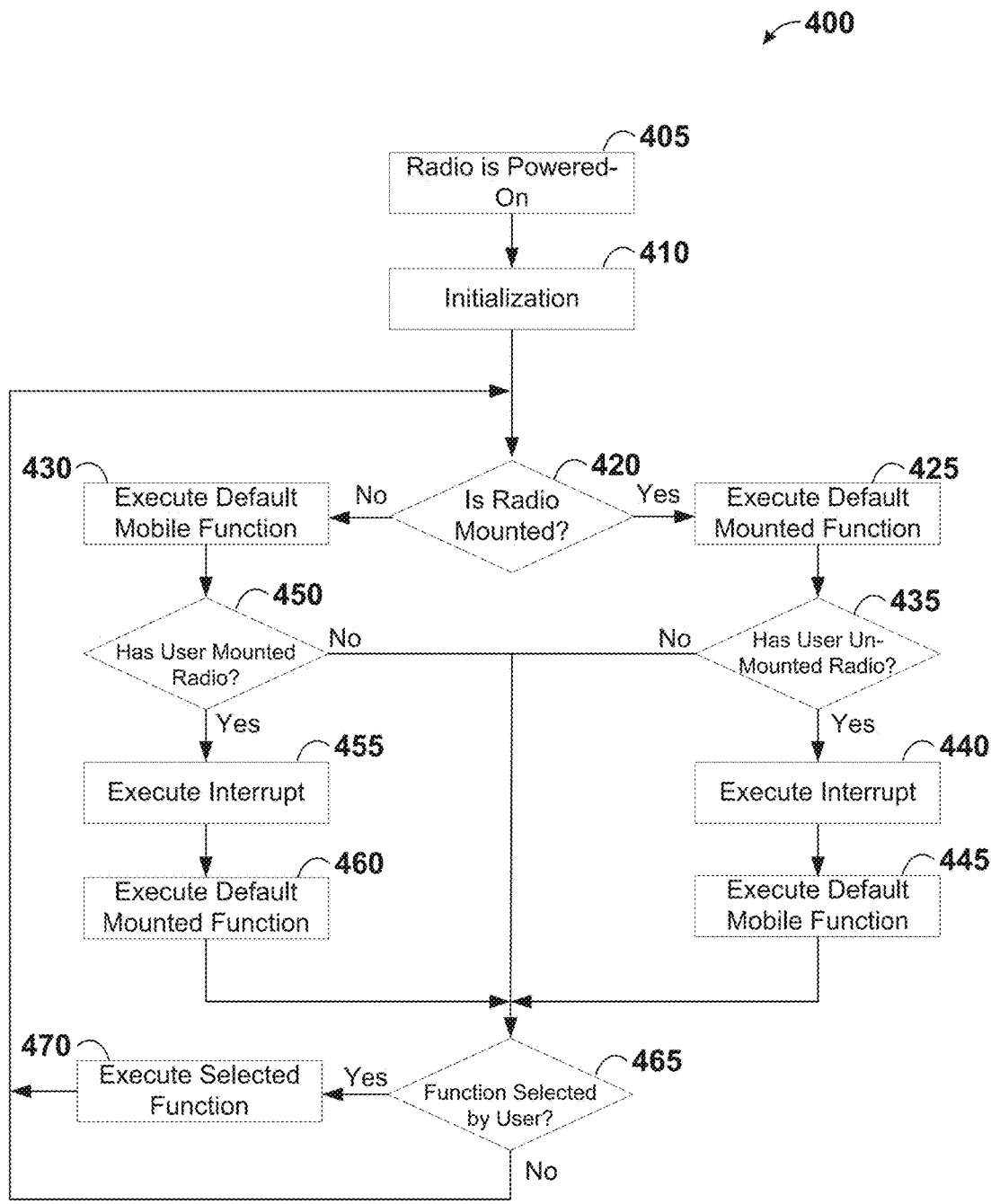
FIG. 4 is a flowchart that illustrates operation of the handheld radio based on whether the portable radio is in a mounted or unmounted state.

FIG. 4 is a flowchart 400 illustrating operation of the radio 100 based on whether it is mounted or unmounted. Those skilled in the art will appreciate that in some embodiments, the actual steps taken in the flowchart 400 may differ from those shown. Depending on the embodiment, certain of the steps described may be removed, others may be added. For example, the actual steps and/or order of steps taken in the disclosed processes may differ from those shown in FIG. 4.

The flowchart 400 of FIG. 4 begins with a first step 405 when the radio 100 is powered on. The radio 100 then goes through an initialization 410 process to load operating software and/or firmware, test operational status, and so forth. During initialization 410 in a mounted state, the radio 100 tests operation of the mobile mount 110, as well as communication between the radio 100 and the mobile mount 110. During 410, the radio 100 loads a default functional profile. This profile defines the functionality of the physical interfaces of the radio 100 (i.e., the PTT switches 205a-b, the buttons of the keypad 210, etc.) by mapping executable instructions to one or more of the physical interfaces upon power up of the radio 100. For example, a particular function (e.g., transmit voice mode) is mapped to a user interface component (e.g., PTT switches 205a-b) on the radio 100 or mobile mount 110. As such, the functional profile can map any number of functions to any of the user interface components. The user can select the default functional profile to one of a number of stored functional profiles.

In one implementation, the radio 100 has a number of default functional profiles that are loaded depending on the state of the radio when it is powered on. In one example, shown in step 420, the radio 100 loads a default functional profile based on whether the radio 100 is mounted to the mobile mount 110. In this example, if the radio 100 is powered on while mounted to the mobile mount 110, the radio 100 can go on to step 425 and load a default mounted function. The default mounted function includes the default functional profile that is loaded by the radio 100 when mounted to the mobile mount 110. In one example, the default mounted function includes instructions for charging the battery 155 of the radio 100 via conductive pins 160 and ECR 315. In an alternative embodiment, the default mounting function includes instructions for engaging the processing unit 305 as a coprocessor for a CPU or processor of the mobile mount. As such, when the radio 100 is mounted, the mobile mount 110 relies on the processing unit 305 for direct control of all or some of the mobile mount 110 functionality via the conductive pins 160 and ECR 315 connection. The converse is also available. For example, when the radio 100 is mounted, a CPU or processor (not illustrated) of the mobile mount 110 can assume direct control of all or some of the radio 100 functionality via the conductive pins 160 and ECR 315 connection. As such, the conductive pins 160 and ECR 315 connection can bring the functionality and/or control of either the radio 100 or the mobile mount 110, to the other. For example, an external antenna connected to the antenna connector 180 of the mobile mount 110 may provide additional frequency range, higher power levels, and greater range to the radio 100 when the radio 100 is mounted, thereby expanding the operational capabilities of the radio 100.

The processing unit 305 of the radio 100 receives a signal, via the ECR 315, from the conductive pins 160 of the mobile mount 110 during the initialization process 410, notifying the radio 100 that it is mounted to the mobile mount 110. The default mounted function includes instructions that map or assign radio 100 control interfaces (i.e., functionality of the dual PTT switches 205a/b and keypad 210) to the control panel 120 of the mobile mount 110. As one example, a switch or button on the control panel 120 can function as the PTT switch along with, or in lieu of, the dual PTT switches 205a-b on the radio 100. In this example, the user can activate voice transmission and/or reception mode using a switch or button on, or connected to, the control panel 120 instead of the PTT switches 205a-b on the radio 100. Other functionalities the radio 100 assigns to the mobile mount 110 include channel frequency selection, waveform selection, emergency alert, squelch, repeater/talk-around, etc. As such, the user can control the other functionalities of the radio 100 via the control panel 120. In one implementation, the dual PTT switches 205a-b and the keypad 210 can be assigned to perform different functions while mounted to the mobile mount 110. As one example, the user can control the volume and frequency channel using the keypad or the dual PTT switches 205a-b on the radio 100 while mounted.

In the event that of the radio 100 being powered on while portable (i.e., radio 100 is not mounted to mobile mount 110), the radio 100 loads a default portable function, as shown in step 430. In one implementation, the default portable function includes an ergonomic preference. For example, the default portable function includes a functional profile for a left-handed user. In this example, the radio 100 loads stored instructions that assign functions to the various buttons and switches on the radio 100 to accommodate the left-handed user. As such, the PTT switch 205*b* can be set as the only switch that activates the voice transmission and reception modes on the radio 100. Similarly, the default functional profile can include a right-handed user functionality, where the PTT switch 205*a* can be set as the only switch that activates the voice transmission and reception modes on the radio 100. In one implementation, the default portable function includes a functional profile for executing voice transmission and reception modes upon activation of one of either of the dual PTT switches 205*a-b*, or concurrent activation of both of the dual PTT switches 205*a-b*. Concurrent activation of both of the dual PTT switches 205*a-b* offers the advantage of ensuring that there are no false triggered voice transmissions by requiring that the user activate both of the dual PTT switches 205*a-b*. In another implementation, the default portable function includes the use of either PTT switch 205*a-b* to activate the voice transmission mode, where activation of both switches during voice transmission mode has no additional effect. In this example, the user can press either, or both, of the PTT switches 205*a-b* to activate voice transmission mode.

In steps 435 and 450 of FIG. 4, the default functional profile of the radio 100 is updated upon a change of state. In the depicted embodiment, the change of state includes the radio 100 being removed from, or mounted to, the mobile mount 110. As one example, at step 435, the user removes the radio 100 from the mobile mount 110. Upon removal, the processing unit 305 of the radio 100 ceases to receive the signal notifying the radio 100 that it is mounted. At this point, the processing unit 305 of the radio 100 executes a software interrupt at step 440, followed by loading and executing the default portable function at step 445. Similarly, at step 450, the user mounts the radio 100 to the mobile mount 110. Upon mounting the radio 100, the processing unit 305 of the radio 100 receives the signal, via the ECR 315 and conductive pins 160 of the mobile mount, notifying the radio 100 that it is mounted. At this point, the processing unit 305 of the radio 100 executes the software interrupt at step 455, followed by loading and executing the default mounted function 460.

At step 465, the user selects a functional profile, from a number of profiles, stored on the processing unit 305 of the radio 100. Upon selection of a functional profile, the radio 100 executes the selected function at step 470. The user can utilize the keypad 210 and/or the PTT switches 205*a-b* to select a functional profile from the number of different functional profiles. Functional profiles of the radio 100 can be pre-programmed and stored on the radio 100 or mobile mount 110, or generated by the user. As one example, the user mounts the radio 100 to the mobile mount 110, and connects a computer to the interface panel 135 of the mobile mount 110. The user has access the processing unit 305 of the radio 100 through this interface, by which the user can generate and store unique functional profiles, or edit preexisting functional profiles. As such, the user maps or assigns various functions to the buttons and switches on the radio 100, and stores the assignments under one or more profiles. For example, the radio 100 includes software that provides the user with the option of generating and storing unique functional profiles on the radio, independent of the mobile mount 110, using the functional interfaces of the radio 100. In another implementation, the user connects the radio 100 to a computer via a serial port on the radio (not illustrated). The user has access to the processing unit 305 of the radio 100 through this interface, by which the user can generate and store unique functional profiles, or edit preexisting functional profiles.

Mobile Mount Radio Ejection Mechanism

FIG. 5 is a plan view of a portion of the radio 100 and mobile mount 110, with a magnified view of a portion of the paddle locking system 105. FIG. 5 shows the mobile mount 110 with the radio 100 mounted, and an external microphone handset 510 attached. A first ejection paddle 505*a* and a second ejection paddle 505*b* are illustrated on either side of the mounted radio 100. The ejection paddles 505*a-b* are constructed from an impact-resistant material such as high impact plastic or metal, and are connected to the paddle locking system 105, such that pressure applied to either, or both, of the ejection paddles 505*a-b* will unlock the radio 100 from the mobile mount 110. The two paddle system improves reliability and use of the radio system 200 by providing multiple points of operation, giving both driver and passenger access, or alternatively, operator and carrier.

Figure 6A:
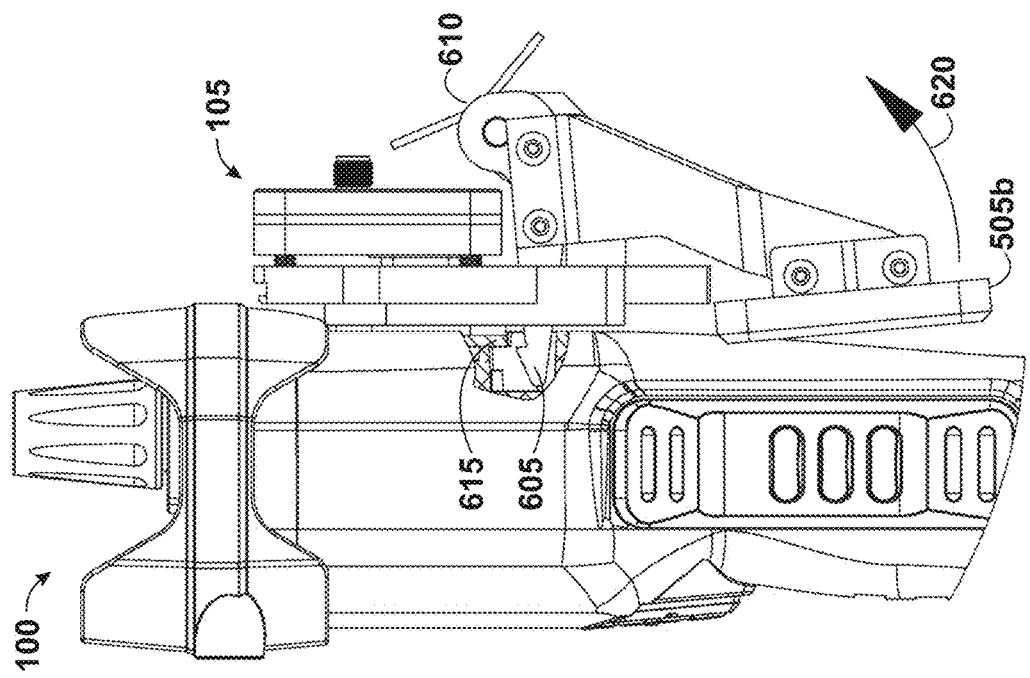
FIG. 6A is a right side perspective view of the handheld radio attached to the mobile mount in a locked position.
Figure 6B:
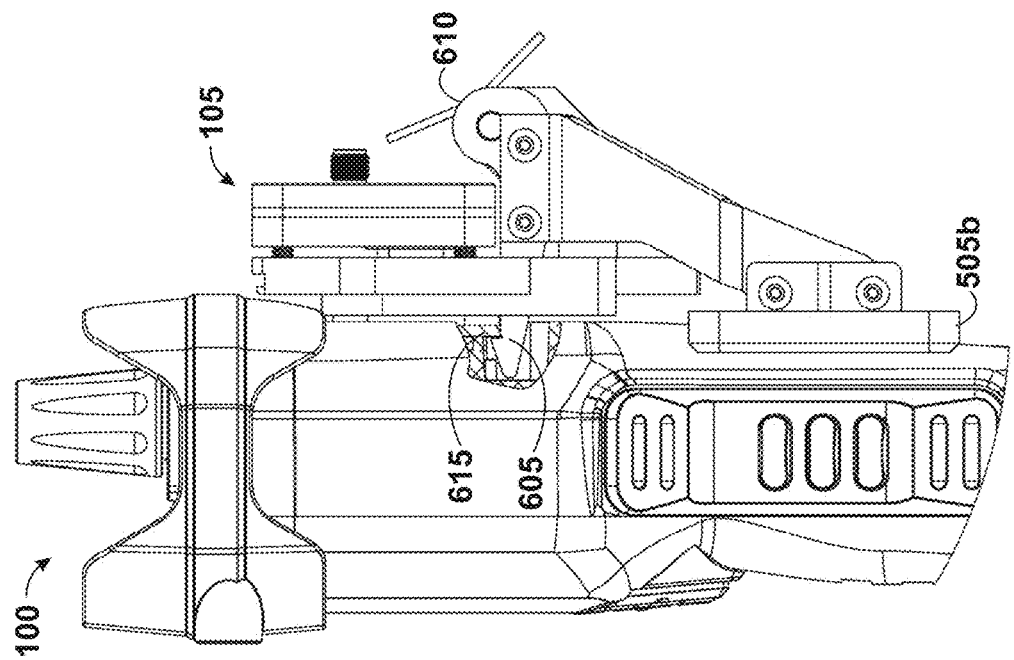
FIG. 6B is a right side perspective view of the handheld radio attached to the mobile mount in an unlocked position.

FIG. 6A is a right side perspective view of the handheld radio attached to the mobile mount in a locked position. FIG. 6B is a right side perspective view of the handheld radio attached to the mobile mount in an unlocked position. In the example of FIGS. 6A and 6B, the paddle locking system 105 includes a plurality of physical components. The physical components of the paddle locking system 105 include a toothed member 605, a spring hinge 610, the first ejection paddle 505*a* (not illustrated), and the second ejection paddle 505*b*. Other aspects of the paddle locking system 105 described above are illustrated in FIGS. 1 and 7 for reference. In other examples, the paddle locking system 105 can include more, fewer, or different physical components.

FIGS. 6A and 6B show detail of the paddle locking system 105 operated by the ejection paddles 505*a-b* on the paddle locking system 105 to facilitate attachment of the radio 100 to the mobile mount 110. The ejection paddles 505*a-b* are integrated with at least one spring hinge 610 that includes a torsional spring to keep the paddle locking system 105 in the locked position illustrated in FIG. 6A. The paddle locking system 105 includes a saw-tooth shaped with a transverse surface and a vertical surface, or simply toothed member 605, connected to the ejection paddles and the spring hinge 610. The transverse surface of the toothed member 605 facilitates ease in attaching the radio 100 to the mobile mount 110, while the vertical surface prevents removal. It will be appreciated that although the saw-tooth shaped toothed member 605 is disclosed and preferred for the present invention, other shapes are also possible, including, for example, a generally rectangular tooth and a symmetrically triangular tooth.

As illustrated in FIG. 6A, the radio 100 includes a catch, or holding pawl 615 for engaging the toothed member 605. The holding pawl 615 permits engagement of the radio 100 with the paddle locking system 105, and interferes with movement of the radio 100 once engaged. In the preferred embodiment, the torsional spring biases the toothed member 605 in an upper position. It will be appreciated that the holding pawl 615 is disposed forwardly of the spring hinge 610, and the torsional spring also biases the ejection paddles 505*a-b* in an outward direction away from the mobile mount 110. As illustrated in FIG. 6B, force can be applied to the ejection paddles 505a-b, pivoting the ejection paddles 505a-b in a backward direction, engaging and rotating the spring hinge 610, this movement indicated by an arrow 620. This movement lowers the toothed member 605 from the holding pawl 615 and releases the radio 100 from the locked position shown in FIG. 6A.

Figure 7:
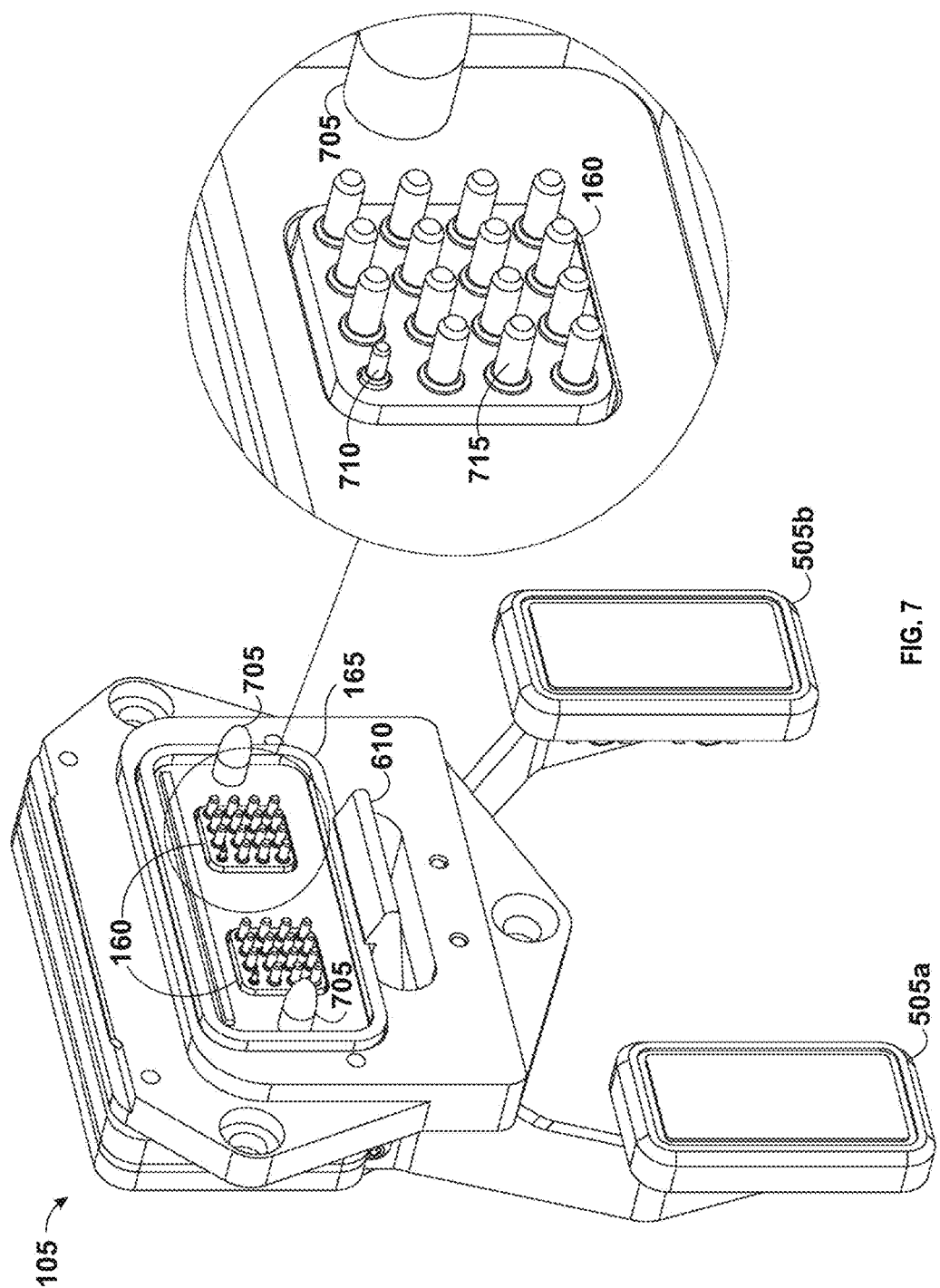
FIG. 7 is a front left perspective of the paddle locking system, with a magnified view of an electrical interface for functionally coupling the handheld radio to the mobile mount.

FIG. 7 is a front left perspective of the paddle locking system 105, with a magnified view of an electrical interface for functionally coupling the radio 100 to the mobile mount 110. The paddle locking system 105 includes a plurality of physical components not shown in FIGS. 6A and 6B. The physical components of the paddle locking system 105 include the gasket 165, a pair of dowel locating pins 705, and the array of conductive pins 160. The array of conductive pins 160 include at least one short pin 710, and a plurality of long pins 715. The short pins 710 and the long pins 715 can be used to generate various signals that are indicative of docking/undocking events, and/or processor communication between the radio 100 and the mobile mount 110. Other aspects of the paddle locking system 105 described above are illustrated in FIGS. 1, 5, 6A, and 6B for reference. In other examples, the paddle locking system 105 can include more, fewer, or different physical components.

FIG. 7 illustrates a detailed view of the paddle locking system 105. The paddle locking system 105 may be formed from an impact-resistant material such as high impact plastic and/or metal. In the depicted embodiment, the array of conductive pins 160 are formed of an electrically conductive material, such as copper or aluminum. The paddle locking system 105 locks the radio 100 into a fixed position when mounted to the mobile mount 110. The pair of dowel locating pins 705 secure the upper sides of the radio to restrict lateral movement of the radio, and also ensure that the conductive pins 160 are properly mated with the ECR 315.

The conductive pins 160 form a functional and physical interface between the processing unit 305 of the radio 100 and the CPU or processor of the mobile mount 110, via the ECR 315. From a functional perspective, the processing unit 305 is configured to operate as a coprocessor for the mobile mount 110. As such, when the radio 100 is mounted, the mobile mount 110 can rely on the processing unit 305 for direct control of all or some of the mobile mount 110 functionality via the conductive pins 160 and ECR 315 connection. The converse is also available. For example, when the radio 100 is mounted, a CPU or processor (not illustrated) of the mobile mount 110 can assume direct control of all or some of the radio 100 functionality via the conductive pins 160 and ECR 315 connection. As such, the conductive pins 160 and ECR 315 connection can bring the functionality and/or control of either the radio 100 or the mobile mount 110, to the other. For example, an external antenna connected to the antenna connector 180 of the mobile mount 110 may provide additional frequency range to the radio 100 when the radio 100 is mounted, thereby expanding the operational frequency spectrum.

In one implementation, the conductive pins 160 and ECR connection facilitates battery 155 charging while the radio 100 is mounted. Placement of the radio in the enclosure 130 ensures the direction of charging current flow into the battery 155. The conductive pins 160 may automatically charge the battery 155 attached to the radio 100 upon creating contact with the conductive pins 160, using proper charge current. The mobile mount 110 and/or radio 100 self-regulate the charging of the battery 155 by monitoring battery voltage and capacity. In one example, the processing unit 305 monitors the battery voltage at the battery terminal 310a and transmit this information periodically to the mobile mount 110 via the conductive pins 160. The mobile mount can automatically terminate the charging of the battery 155 upon reaching a rated terminal voltage at the battery 155. Continuous charging can damage the batteries and render the batteries unfit for use. As such, monitoring of the battery charge is necessary to maintain the longevity of battery use.

In one implementation, the radio 100 may provide battery information to the mobile mount 110. The mobile mount 110 then determines a charging mode based on the type of battery 155. For example, the radio 100 may provide information, via the conductive pins 160, to the mobile mount 110 identifying a type of battery (e.g., Li-ion, NiCd, NiMH), a charge held, a charge state, a peak load current, a charge time, etc. Based on the information, the mobile mount can regulate the charging of the battery 155 using different charging modes (e.g., a trickle-charge mode, a constant-voltage mode, a constant-current mode, and a top-off mode), and varying the charging current and/or voltage. In another implementation, the mobile mount 110 determines the type of battery by identifying an electrical signature based on voltage properties of known battery types.

In one implementation, the conductive pins 160 and ECR 315 connection brings functionality and/or control to the radio 100 and mobile mount 110 using the plurality of long pins 715. Each of the long pins 715 has a direct connection to multiple physical components of the mobile mount 110 and radio 100. As such, the long pins 715 are utilized to transmit power, GPS data, RF signals, and discrete data. The short pin 710 can provide a signal to the radio 100 and the mobile mount 110. For example, when the short pin 710 of the conductive pins 160 engages with the ECR 315, the radio 100 and/or the mobile mount receives a logic signal voltage level indicating that the radio 100 has been mounted to the mobile mount 110. Upon indication of the mount, functionality of the mobile mount 110 and/or the radio 100 changes to the default mounted function. The advantage of using the short pin 710 to indicate the mount, is that the ECR 315 of the radio 100 may not be fully engaged with the conductive pins 160. By using the short pin 710, full engagement of the ECR 315 to the conductive pins 160 is ensured. In an alternative embodiment, the radio 100 and/or the mobile mount receive a logic signal voltage level indicating that the radio 100 has been mounted to the mobile mount 110 via one or more of the long pins 715.

In another implementation, disengagement of the short pin 710 of the conductive pins 160 from the ECR 315 triggers a processor interrupt, or other hardware detection, for both or either of the radio 100 and the mobile mount 110. In this manner, when the short pins 710 on both sides of the conductive pins 160 are connected to the radio 100, a signal indicates that the radio 100 is mounted to the mobile mount 110. This configuration ensures that the processing unit 305 and/or the CPU or processor of the mobile mount 110 are interrupted after the short pins 710 on both ends of the conductive pins 160 are connected and/or disconnected.

In another implementation, the short pin 710 functions to inform the processing unit 305 and the CPU or processor of the mobile mount 110 that the long pins 715 have connected, and the radio 100 is mounted. In a similar manner, the short pin 710 will be the first to disconnect and provide a preliminary warning or process interrupt caused by the undocking event which will allow the processing unit 305 and the CPU or processor to complete communications during the undocking process. As illustrated in FIG. 7, there can be two short pins 710, one associated with each of the two arrays of conductive pins 160. Separating the short pins 710 by a distance on the conductive pins 160 aids in accounting for situations in which the radio 100 is docked or undocked in a slightly sideways or torqued manner. In such a case, the pins may not be uniformly coupled/decoupled. Having the short pins 710 on only one end of the conductive pins 160 may therefore provide an inaccurate indication of the connection status of the other pins. Thus, having two short pins 710 provides a fail-safe mechanism for ensuring that the radio 100 is properly docked. If less than all of the short pins are engaged while mounted, the radio 100 and/or the mobile mount may indicate an error. Having two short pins 710 also provides a dual redundant aspect in the event one of the short pins 710 fails. For example, if one pin fails to indicate that the radio 100 is mounted or unmounted, the user will be notified of the failure to fully engage. In such a case, the user can override the failure and rely on the working short pin 710.

Mobile Mount Battery Charger

FIG. 8 is a front plan view of a portion of the radio 100 and mobile mount 110, with magnified view of a spare battery 115 attached to a battery charger 140 on the mobile mount. As described briefly above, the mobile mount 110 includes the battery charger 140 for charging a spare battery 115. In one embodiment, the battery charger 140 includes a battery connector plug rotatably attached to the spare battery connection receptacle 310b of the spare battery 115. In another embodiment, the battery connector plug and the battery connection receptacle 310b include one of a solder cup or printed circuit board termination. The battery connector plug and the spare battery connection receptacle 310b are connected with up to 15 psi of pressure maintaining a connection between contacts. The pressure is generated by a spring loaded contact and a twist-lock mating mechanism that physically secures the spare battery 115 to both the radio 100 and mobile mount 110, via the battery charger 140. The connectors ensure proper direction of charging current flow into the battery.

The connector includes conductive contacts between the battery 155 and the radio 100 by which the battery 155 can supply power to the radio 100. The battery connector plug and the spare battery connection receptacle 310b also include conductive contacts between the spare battery 115 and the mobile mount 110 by which the mobile mount 110 can supply the spare battery 115 with power to charge the spare battery 115. The battery connector plug and the spare battery connection receptacle 310b also provide a ruggedized seal connection between the spare battery 115 and the mobile mount 110, making the connection substantially water proof and shock proof.

The mobile mount 110 battery charger 140 can self-regulate the charging of the spare battery 115 by monitoring voltage and capacity. In one example, the mobile mount 110 monitors the spare battery 115 voltage at the battery terminal 310a. The mobile mount automatically terminates the charging of the spare battery 115 upon reaching a rated terminal voltage at the spare battery 115. In another implementation, the mobile mount 110 determines spare battery 115 information based on the load of the spare battery 115, and based on transmitting varying currents to the spare battery 115. The mobile mount 110 can then determine a charging mode based on the battery information. In another example, the user may select a type of battery or provide battery information to the mobile mount 110 via the control panel 120 and/or keypad 210. The battery information may identify a type of battery (e.g., Li-ion, NiCd, NiMH), a charge held, a charge state, a peak load current, a charge time, etc. Based on the information, the battery charger 140 can regulate the charging of the spare battery 115 using different charging modes (e.g., a trickle-charge mode, a constant-voltage mode, a constant-current mode, and a top-off mode), and varying the charging current and/or voltage.

Figure 9C:
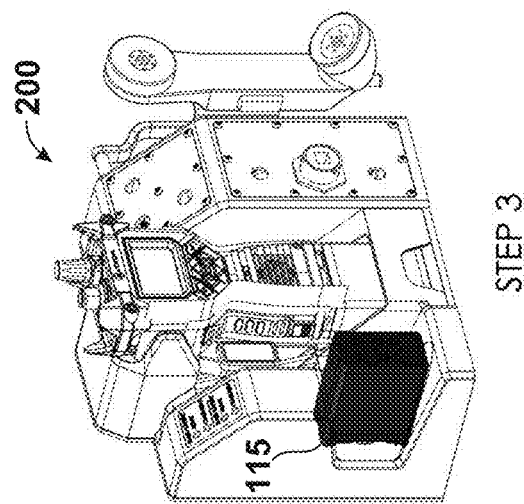
FIG. 9C is a front left perspective view of the handheld radio attached to the mobile mount, illustrating a third step for attaching the spare battery to the battery charger.
Figure 9B:
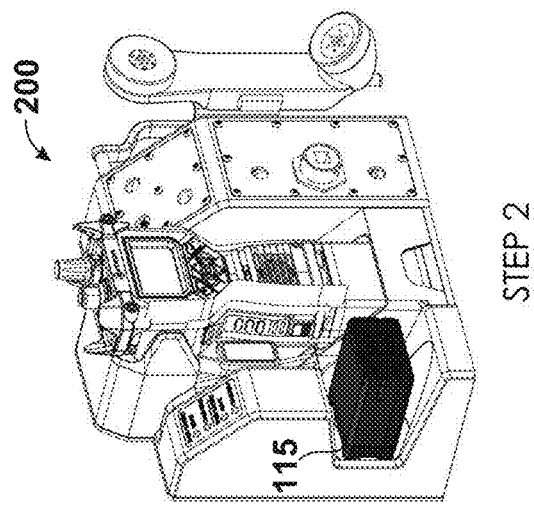
FIG. 9B is a front left perspective view of the handheld radio attached to the mobile mount, illustrating a second step for attaching the spare battery to the battery charger.
Figure 9A:
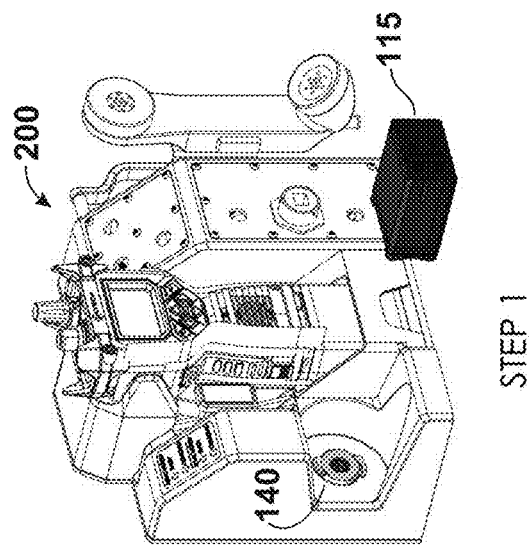
FIG. 9A is a front left perspective view of the handheld radio attached to the mobile mount, illustrating a first step for attaching the spare battery to the battery charger.

FIG. 9A is a front left perspective view of the radio 100 attached to the mobile mount 110, illustrating a first step for attaching the spare battery 115 to the battery charger 140. FIGS. 9B and 9C are substantially similar, and are provided FIG. 9A to illustrate three steps for attaching the spare battery 115 to the battery charger 140 of the mobile mount 110. The steps illustrated are examples. Other implementations are contemplated, including battery orientation, battery attachment, and connection. For example, FIG. 9A illustrates a first step of attaching the spare battery 115 where the spare battery 115 is oriented substantially horizontal. In other embodiments, the spare battery 115 orientation of the first step may be vertical, or the orientation may be determined by the user for ease of access.

FIG. 9A shows the first step to attaching the spare battery 115 to the battery charger 140. The user orients the spare battery 115 such that the threads of a connection port will allow the spare battery 115 to be flush with the battery charger 140. FIG. 9B shows the spare battery 115 as flush with the battery charger 140. The user can then proceed to rotate the spare battery 115 to achieve a locked position with the battery charger 140. FIG. 9C shows the spare battery 115 in a locked position. In this example, the spare battery 115 is rotated clock-wise by 90 degrees to fully lock with the battery charger 140.

Other Considerations

As used herein, the term "channel frequency selection" refers to switching the radio to difference frequency channels. The term "push-to-talk switch" or "PTT switch" refers to a switch or button that the user triggers to talk, and releases to listen. The term "waveform selection" may refer to selecting and switching the waveform or mode of the radio. The term "emergency alert" may refer to the user's ability to send a priority emergency alert to a specific end-user. For example, the end-user may be a radio or dispatch center. Emergency alerts may have priority over all other calls.

As used herein, the term "ruggedized" refers to an article specifically designed to operate reliably in harsh usage environments and conditions, such as strong vibrations, extreme temperatures, and wet or dusty conditions. The term also refers to a design of the article for the type of rough use typified by these conditions, not just in the external housing but also in the internal components and cooling arrangements as well.

MIL-STD-810, Environmental Engineering Considerations and Laboratory Tests, is a United States Military Standard that emphasizes tailoring an equipment's environmental design and test limits to the conditions that it will experience throughout its service life, and establishing chamber test methods that replicate the effects of environments on the equipment rather than imitating the environments themselves. The MIL-STD-810 test series are approved for use by all departments and agencies of the United States Department of Defense (DoD). The standard's guidance and test methods are intended to: (i) Define environmental stress sequences, durations, and levels of equipment life cycles; (ii) Be used to develop analysis and test criteria tailored to the equipment and its environmental life cycle; (iii) Evaluate equipment's performance when exposed to a life cycle of environmental stresses; (iv) Identify deficiencies, shortcomings, and defects in equipment design, materials, manufacturing processes, packaging techniques, and maintenance methods; and (v) Demonstrate compliance with contractual requirements. In one implementation, the tactical multi-band radio system 200, and its constituent components, are designed and produced in compliance with MIL-STD-810.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The various illustrative blocks, modules, and circuits described in connection with the implementations disclosed herein may be implemented or performed with one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A ruggedized mobile mount for a handheld radio, comprising:
    a housing configured to be removably attached to a vehicle and including at least one compartment configured to secure the handheld radio;
    a power port configured to receive power from the vehicle;
    a detachment mechanism comprising:
        a first pad on a left side of the detachment mechanism,
        a second pad on the right side of the detachment mechanism,
        a plurality of pins configured to engage with the handheld radio and arranged into two spatially separated groups, each group comprising a first section of pins and a second section of pins, wherein the second section of pins are shorter than the first section of pins,
        wherein the detachment mechanism is configured to removably attach the handheld radio to the mobile mount, and
        wherein the first pad and the second pad are configured to release the handheld radio from the plurality of pins upon a depression of either of the first pad or the second pad; and
    a processor for executing a process interrupt upon a break in contact between the handheld radio and the second section of pins.

2. The ruggedized mobile mount of claim 1, further comprising an antenna port configured to removably attach to an antenna connected to the vehicle.

3. The ruggedized mobile mount of claim 1, wherein the processor is further configured to communicate data with the handheld radio via the pins.

4. The ruggedized mobile mount of claim 1, wherein the pins are configured to communicate GPS data and radio frequency (RF) data between the handheld radio and the mobile mount.

5. A method of detaching the handheld radio from the mobile mount as claimed in claim 1, comprising actuating the detaching mechanism so as to detach the handheld radio.

6. A method of attaching the handheld radio to the mobile mount as claimed in claim 1, comprising actuating the detaching mechanism so as to attach the handheld radio.

7. A ruggedized mobile mount for a handheld radio, comprising:
- a detachment mechanism configured to removably attach the handheld radio to the mobile mount, comprising:
  - a first set of electrically conductive pins,
  - a second set of electrically conductive pins, wherein the second set of pins are shorter in length relative to the first set of pins,
  - a first pad and a second pad attached to a locking member configured to removably attach a set of conductive contacts on the handheld radio to the first set and the second set of electrically conductive pins.

8. The ruggedized mobile mount of claim 7, wherein each of the first pad and the second pad are attached to a respective elongated member forming a pair of extensions from a torsional spring hinge.

9. The ruggedized mobile mount of claim 7, wherein the first pad is located on a left side of the detachment mechanism and the second pad is located on a right side of the detachment mechanism, such that the first pad is adjacent to a left side of the handheld radio and the second pad is adjacent to a right side of the handheld radio when the radio is attached to the mobile mount.

10. The ruggedized mobile mount of claim 7, wherein the first pad and the second pad are configured to detach the handheld radio from the mobile mount upon depression of either of the first pad or the second pad.

11. The ruggedized mobile mount of claim 7, wherein the first and second sets of pins are arranged into two spatially separated groups configured to receive and electrically connect to a set of electrically conductive and spatially complementary pads on the handheld radio when the radio is attached to the mobile mount.

12. The ruggedized mobile mount of claim 7, further comprising a processor configured to transfer control to an interrupt handler upon a break in contact between the handheld radio and the second set of pins.

13. The ruggedized mobile mount of claim 7, wherein the first and second pads are symmetrical about a vertical axis.

14. The ruggedized mobile mount of claim 8, further comprising a wedge-shaped locking member configured to be rotated about a pivot point of the torsional spring hinge upon depression of either of the first pad or the second pad.

15. The ruggedized mobile mount of claim 14, wherein the locking member is configured to removably attach the handheld radio to the mobile mount via a structural catch forming a cavity in the handheld radio.

16. The ruggedized mobile mount of claim 7, wherein each of the first and second pads comprise a rectangular pad attached to a respective elongated member.

17. The ruggedized mobile mount of claim 7, wherein each of the first and second pads are biased in a locked position by a torsional spring.

18. A method of detaching the handheld radio from the mobile mount as claimed in claim 7, comprising actuating the detaching mechanism so as to detach the handheld radio.

19. A method of attaching the handheld radio to the mobile mount as claimed in claim 7, comprising actuating the detaching mechanism so as to attach the handheld radio.

* * * * *